United States Patent
Wu et al.

(10) Patent No.: US 10,815,336 B2
(45) Date of Patent: Oct. 27, 2020

(54) BRANCHED POLYMER, METHOD FOR PREPARING THE SAME AND METHOD FOR PREPARING A FOAM

(71) Applicant: INDUSTRIAL TECHNOLOGY RESEARCH INSTITUTE, Hsinchu (TW)

(72) Inventors: Jin-An Wu, Huwei Township (TW); Wen-Chung Liang, Hsinchu (TW); Chin-Lang Wu, Tongsiao Township (TW); Shihn-Juh Liou, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 454 days.

(21) Appl. No.: 15/852,952

(22) Filed: Dec. 22, 2017

(65) Prior Publication Data

US 2019/0010278 A1 Jan. 10, 2019

(30) Foreign Application Priority Data

Jul. 7, 2017 (TW) .............................. 106122829 A

(51) Int. Cl.

| C08G 63/91 | (2006.01) |
| C08J 9/00 | (2006.01) |
| B29C 44/34 | (2006.01) |
| C08K 5/05 | (2006.01) |
| C08J 9/12 | (2006.01) |
| C08J 9/10 | (2006.01) |
| C08K 5/13 | (2006.01) |
| C08G 101/00 | (2006.01) |
| C08K 5/00 | (2006.01) |

(52) U.S. Cl.
CPC .......... *C08G 63/916* (2013.01); *C08J 9/0061* (2013.01); *C08J 9/10* (2013.01); *C08J 9/122* (2013.01); *C08K 5/05* (2013.01); *C08K 5/13* (2013.01); *C08G 2101/005* (2013.01); *C08J 2201/03* (2013.01); *C08J 2203/04* (2013.01); *C08J 2203/06* (2013.01); *C08J 2205/044* (2013.01); *C08J 2367/02* (2013.01); *C08J 2467/02* (2013.01); *C08K 5/005* (2013.01)

(58) Field of Classification Search
CPC ... C08G 63/916; C08J 9/0061; C08J 2201/03; C08J 2205/044; C08K 5/05; B29C 44/3403; B29C 44/3415; B29C 44/3442
See application file for complete search history.

(56) References Cited

U.S. PATENT DOCUMENTS

| 4,176,101 A | 11/1979 | Leslie et al. |
| 5,128,202 A | 7/1992 | Subramanian et al. |
| 5,229,432 A * | 7/1993 | Muschiatti ............. C08G 63/20 521/182 |
| 5,310,799 A | 5/1994 | Carson et al. |
| 5,422,381 A | 6/1995 | Al Ghatta et al. |
| 5,482,977 A | 1/1996 | McConnell et al. |
| 5,519,066 A | 5/1996 | McConnell et al. |
| 5,820,982 A | 10/1998 | Salsman |
| 6,284,864 B1 | 9/2001 | Roderiguez et al. |
| 6,841,106 B1 | 1/2005 | Fujimaki et al. |
| 8,771,583 B2 | 7/2014 | Sequeira |
| 2012/0178837 A1 * | 7/2012 | Mehta ........................ C08J 9/12 521/79 |
| 2013/0216753 A1 | 8/2013 | Sequeira |
| 2014/0357744 A1 | 12/2014 | Lauri et al. |

FOREIGN PATENT DOCUMENTS

| CN | 1196734 C |  | 4/2005 |
| CN | 1772790 A | * | 5/2006 |
| CN | 101544812 A |  | 9/2009 |
| CN | 102459461 A |  | 5/2012 |
| CN | 102807743 A |  | 5/2012 |
| CN | 102807743 A | * | 12/2012 |
| CN | 103788587 A | * | 5/2014 |
| CN | 102993421 B |  | 7/2015 |
| CN | 103497492 B |  | 7/2015 |
| CN | 105694385 A |  | 6/2016 |
| CN | 104804381 B |  | 9/2016 |
| EP | 0475142 A2 |  | 3/1992 |
| TW | 201609905 A |  | 3/2016 |

OTHER PUBLICATIONS

Machine-generated English-language translation of CN-1772790-A.*
Machine-generated English-language translation of CN-103788587-A.*
Bimestre et al., "Chain Extension of Poly (Ethylene Terephthalate) by Reactive Extrusion with Secondary Stabilizer," Materials Research, vol. 15, No. 3, 2012, pp. 467-472.
Coccorullo et al., "Theoretical and Experimental Study of Foaming Process with Chain Extended Recycled PET," eXPRESS Polymer Letters, vol. 3, No. 2, 2009, pp. 84-96.
Forsythe et al., "Rheological Properties of High Melt Strength Poly(Ethylene Terephthalate) Formed by Reactive Extrusion," Journal of Applied Polymer Science, vol. 100, 2006, pp. 3646-3652.

(Continued)

*Primary Examiner* — Vu A Nguyen
(74) *Attorney, Agent, or Firm* — Birch, Stewart, Kolasch & Birch, LLP

(57) ABSTRACT

A branched polymer, a preparation method thereof and a method for preparing a foam are provided. The branched polymer is a transesterification product of a composition, and the composition includes 100 parts by weight of polyethylene terephthalate and 0.5-2.0 parts by weight of polyol. The branched polymer has an inherent viscosity of from 1.2 dL/g to 1.6 dL/g, a number average molecular weight of from 75,000 g/mol to 90,000 g/mol, a polydispersity index from 3.0 to 6.0, a melt index from 0.8 g/10 min to 7.5 g/10 min, a shear viscosity from 800 Pa·s to 1900 Pa·s, and a melt strength from 30 cN to 80 cN.

16 Claims, No Drawings

(56) References Cited

OTHER PUBLICATIONS

Japon et al., "Reactive Processing of Poly(Ethylene Terephthalate) Modified with Multifunctional Epoxy-Based Additives," Polymer, vol. 41, 2000, pp. 5809-5818.
Xanthos et al., "Identification of Rheological and Structural Characteristics of Foamable Poly(Ethylene Terephthalate) by Reactive Extrusion," Polymer International, vol. 53, 2004 (published on web Jun. 1, 2004), pp. 1161-1168.
Chinese Office Action and Search Report for Chinese Application No. 201710600229.2, dated Apr. 17, 2020.
Taiwan Office Action for Appl. No. 106122829 dated Jan. 15, 2018.

\* cited by examiner

BRANCHED POLYMER, METHOD FOR PREPARING THE SAME AND METHOD FOR PREPARING A FOAM

CROSS REFERENCE TO RELATED APPLICATIONS

The application is based on, and claims priority from, Taiwan Application Serial Number 106122829, filed on Jul. 7, 2017, the disclosure of which is hereby incorporated by reference herein in its entirety.

TECHNICAL FIELD

The technical field relates to a branched polymer, a preparation method thereof and a method for preparing a foam.

BACKGROUND

Thermoplastic polyester is a polymer with repeat units having an ester group, and could be prepared by reacting a polyacid with a polyol via condensation polymerization. Linear polyester (such as polyethylene terephthalate, PET) could be prepared by reacting a diacid with a diol via condensation polymerization. Polyethylene terephthalate exhibits great mechanical strength, dimensional stability, chemical resistance, and low hygroscopicity. The foam prepared from polyethylene terephthalate is widely used in power device, optical device, transportation, construction, or packaging material.

Since the conventional polyethylene terephthalate is a linear crystalline polyester and exhibits low melt viscosity and low melt strength in a molten state, the shape of bubble of the foam prepared from the conventional polyethylene terephthalate is not apt be maintained during the foaming process. Accordingly, there is a need to develop a novel polyethylene terephthalate for use in the foaming process.

SUMMARY

According to embodiments of the disclosure, the disclosure provides a branched polymer. The branched polymer is a transesterification product of a composition. The composition includes 100 parts by weight of polyethylene terephthalate and 0.5-2 parts by weight of polyol. The branched polymer has an inherent viscosity from 1.2 dL/g to 1.6 dL/g, a number average molecular weight (Mn) from 75,000 g/mol to 90,000 g/mol, and a polydispersity index (PDI) from 3.0 to 6.0, a melt index (MI) from 0.8 g/10 min to 7.5 g/10 min, a shear viscosity from 800 Pa·s to 1900 Pa·s, and a melt strength from 30 cN to 80 cN.

According to another embodiment of the disclosure, the disclosure provides a method for preparing the aforementioned branched polymer. The method includes subjecting a composition to a transesterification via an extruder to obtain a pellet, drying the pellet, and subjecting the pellet to a solid-state polymerization. The composition includes 100 parts by weight of polyethylene terephthalate and 0.5-2 parts by weight of polyol, wherein the polyethylene terephthalate has a number average molecular weight (Mn) from 30,000 g/mol to 55,000 g/mol and an inherent viscosity from 0.40 dL/g to 0.95 dL/g.

According to some embodiments of the disclosure, the disclosure provides a method for preparing a foam. The method includes compounding the aforementioned branched polymer and a polyethylene terephthalate to obtain a mixture, and then subjecting the mixture to a foaming process. The weight ratio between the branched polymer and the polyethylene terephthalate is from 1:9 to 9:1. The foam has an inherent viscosity from 0.95 dL/g to 1.50 dL/g, a shear viscosity from 600 Pa·s to 1400 Pa·s, a melt index from 2.5 g/10 min to 25 g/10 min, and a melt strength from 15 cN to 65 cN.

A detailed description is given in the following embodiments with reference to the accompanying drawings.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

According to some embodiments of the disclosure, a branched polymer and a method for preparing the branched polymer are provided. The polyethylene terephthalate (having specific molecular weight and inherent viscosity) is reacted with polyol via the extruder under specific reaction conditions to perform a transesterification to obtain a pellet, and then the pellet is subjected to a solid-state polymerization to obtain the branched polymer of the disclosure. Due to the high melt viscosity and melt strength, the branched polymer is suitable for use in foaming process. The obtained foam is resistant to deformation (i.e. the bubbles of the foam do not collapse before solidification).

According to some embodiments of the disclosure, the branched polymer of the disclosure can be prepared by reacting 100 parts by weight polyethylene terephthalate with 0.5-2 parts by weight of polyol (may be 1.0, 1.5 or 1.7 parts by weight). The branched polymer can have an inherent viscosity from about 1.2 dL/g to 1.6 dL/g, a number average molecular weight from about 75,000 g/mol to 90,000 g/mol (may be about 80,000, 85,000, or 88,000 g/mol), a polydispersity index from about 3.0 to 6.0, a melt index from about 0.8 g/10 min to 7.5 g/10 min, a shear viscosity from about 800 Pa·s to 1900 Pa·s, and a melt strength from about 30 cN to 80 cN.

According to some embodiments of the disclosure, when the amount of polyol is too low (the polyol, for example, is present in an amount less than 0.5 parts by weight), the melt viscosity and melt strength of the obtained branched polymer (prepared from the pellet, which has a relatively low branching degree, via a solid tackifying). As the result, the obtained branched polymer is not suitable for use in a foaming process to form a foam. In addition, when the amount of polyol is too high (the polyol, for example, is present in an amount greater than 2 parts by weight), the result of transesterification has a relatively high branching degree and exhibits an excessive viscosity since the transesterification is a chain breaking reaction. Therefore, the result of transesterification could not be pelletized to form a pellet.

According to some embodiments of the disclosure, the polyethylene terephthalate of the disclosure has a number average molecular weight (Mn) from about 30,000 to 55,000 g/mol (may be about 35,000, 40,000, 45,000, or 50,000), and the polyethylene terephthalate also has a polydispersity index (PDI) from about 1.4 to 1.8. According to some embodiments of the disclosure, the polyethylene terephthalate can be a commercial (or recycled) non-foamable polyethylene terephthalate. When the polyethylene terephthalate of the disclosure has a too low Mn (such as less than about 30,000), the result of transesterification could not be pelletized to form a pellet due to the low inherent viscosity. In addition, the polyethylene terephthalate, which has an inherent viscosity from about 0.40 dL/g to 0.95 dL/g (may be about 0.45 dL/g, 0.5 dL/g, 0.7 dL/g, 0.8 dL/g, or 0.90 dL/g), is suitable to serve as a component of the composition for transesterification. Mostly commercial (or recycled) non-foamable polyethylene terephthalate has an inherent viscosity within the aforementioned range.

According to some embodiments of the disclosure, the polyol of the disclosure can be polyether polyol having 3-8 hydroxyl groups, aliphatic polyol having 3-8 hydroxyl groups, or a combination thereof. The polyether or aliphatic polyol having 3-8 hydroxyl groups can have Mn from about 70 to 2000 g/mol. The aliphatic polyol can be, for example, glycerin, diglycerol, butanetriol, erythritol, pentaerythritol, xylitol, mannitol, sorbitol, maltitol, dipentaerythritol, or a combination thereof. The polyether polyol can be, for example, 4-arm polyethylene glycol (having a Mn from 500 to 10000 g/mol) or 8-arm polyethylene glycol (having a Mn from 500 to 10000 g/mol).

According to some embodiments of the disclosure, the composition of the disclosure does not include an organic acid (such as polyacid), acid anhydride (such as polyacid anhydride), or epoxy-group-containing compound in order to prevent the polyethylene terephthalate from reacting with the organic acid, acid anhydride, or epoxy-group-containing compound to undergo a polymerization.

According to some embodiments of the disclosure, in order to prevent the polyethylene terephthalate from reacting with the polyol to undergo a copolymerization rather than undergo transesterification, the composition of the disclosure does not include a solvent. Therefore, the composition is subjected to the transesterification by extruding and pelletizing via an extruder. According to some embodiments of the disclosure, the composition is subjected to the transesterification at a temperature that is higher than 220° C. (such as from about 220° C. to 270° C.) by extruding and pelletizing via an extruder.

In addition, the extruder has a screw speed from about 100 rpm to 500 rpm when extruding and pelletizing the composition via the extruder. As the result, the polyol can be uniformly distributed with the polyethylene terephthalate, resulting in undergoing the transesterification. By means of the aforementioned process conditions, the branched polymer of the disclosure, having the specific number average molecular weight, polydispersity index, inherent viscosity, melt index, shear viscosity, and melt strength, can be provided.

According to some embodiments of the disclosure, in order to prevent the branched polymer of the disclosure from oxidation and increase the thermal resistance of the branched polymer of the disclosure, the composition of the disclosure can further include about from 0.1 to 0.5 parts by weight of antioxidant (based on 100 parts by weight of polyethylene terephthalate).

According to some embodiments of the disclosure, the composition of the disclosure can consist of 100 parts by weight polyethylene terephthalate, 0.5 to 2 parts by weight (such as from about 0.5 to 1.5 parts by weight, or from about 1 to 2 parts by weight) of polyol, and about 0.1 to 0.5 parts by weight of antioxidant. The antioxidant can be hindered phenol antioxidant, ester antioxidant, thioester antioxidant, phosphite antioxidant, or a combination thereof. For example, the antioxidant of the disclosure can be 2,6-di-tert-butyl-4-methylphenol, 2,5-di-tert-amylhydroquinone, 2,5-2,5-di-tert-butylhydroquinone), 4,4'-butylidene-bis(3-methyl-6-tert-butylphenol), 2,2'-methylene-bis(4-methyl-6-tert-butylphenol), 2,2'-methylene-bis(4-ethyl-6-tert-butylphenol), 4,4'-thiobis(2-t-butyl-5-methylphenol), 2,2'-thio diethyl bis-[3-(3,5-di-t-butyl-4-hydroxyphenyl)-propionate], pentaerythrityl-tetrakis-[3-(3,5-di-t-butyl-4-hydroxyphenyl)-propionate], 4,4'-thiobis(2-methyl-6-t-butylphenol), 2,2'-thiobis(6-t-butyl-4-methylphenol), octadecyl-[3-(3,5-di-t-butyl-4-hydroxyphenyl)-propionate], triethyleneglycol-bis-[3-(3-t-butyl-4-hydroxy-5-methylphenol)propionate], thiodiethylene bis[3-(3,5-di-t-butyl-4-hydroxyphenyl)propionate], 6,6'-di-t-butyl-2,2'-thiodi-p-cresol), dioctadecyl 3,3'-thiodipropionate, trisnonylphenol phosphite, triphenyl phosphite, diphenyl phosphite, phenyl diisodecyl phosphate, diphenyl isodecyl phosphite, diphenyl isooctyl phosphite, tetraphenyl dipropyleneglycol diphosphite, or a combination thereof.

According to some embodiments of the disclosure, the disclosure also provides a method for preparing the aforementioned branched polymer. The method includes the following steps. First, a composition is subjected to a transesterification via an extruder to obtain a pellet, wherein the composition is defined above. Next, the pellet is dried and then subjected to solid-state polymerization.

According to some embodiments of the disclosure, before subjecting the composition to transesterification via the extruder, the composition can be subjected to a dehydration treatment under pressure from about 20 Pa to 100 Pa at a temperature from about 90° C. to 130° C. for more than 5 hours (such as between 5 and 8 hours), in order to remove the water from the polyethylene terephthalate.

According to some embodiments of the disclosure, solid-state polymerization is performed under pressure from about 10 Pa to 50 Pa at a temperature from about 180° C. to 240° C. for 6 to 24 hours.

For example, the method for preparing the branched polymer of the disclosure may include the following steps. First, a composition is provided, wherein the composition consists of 100 parts by weight of polyethylene terephthalate (having a structure represented by

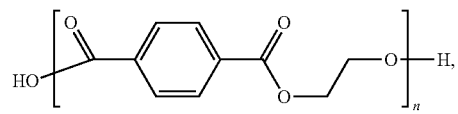

wherein n can be about 300) and 1 part by weight of glycerol. Next, the composition is inserted into an extruder and heated to about 220° C. to 270° C., wherein the extruder has a screw speed from 100 rpm to 500 rpm. Herein, the glycerol reacts with the polyethylene terephthalate to undergo transesterification, i.e. the residual groups, formed by removing hydrogen atoms from terminal hydroxyl groups, of the glycerol would be substituted for the moiety represented by

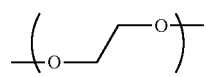

of the polyethylene terephthalate to undergo the transesterification. The probable reaction mechanism of the transesterification is shown below.

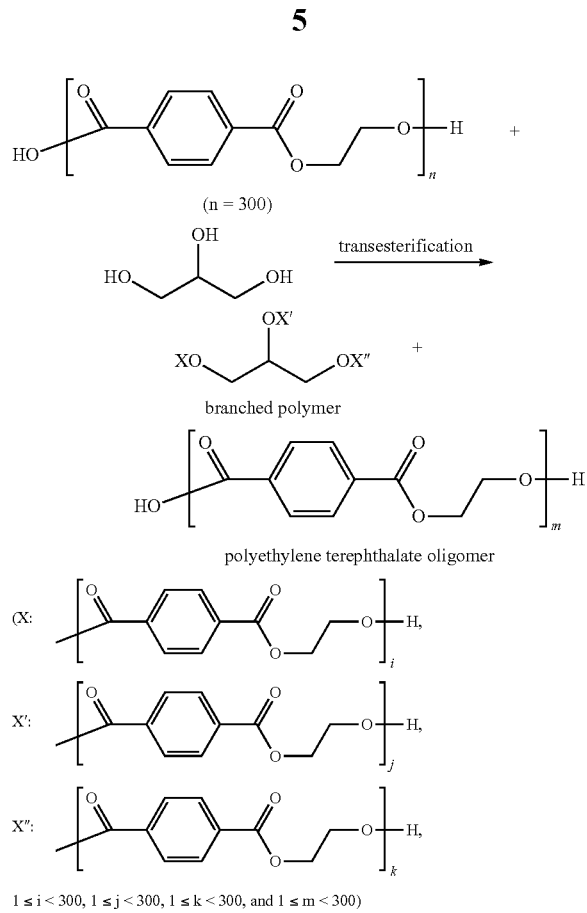

(n = 300)

transesterification branched polymer polyethylene terephthalate oligomer $1 \le i < 300, 1 \le j < 300, 1 \le k < 300,$ and $1 \le m < 300$)

After the transesterification, the moiety represented by

of polyethylene terephthalate is replaced with the residual groups, formed by removing hydrogen atoms from terminal hydroxyl groups of the glycerol. Therefore, the main chain, including n repeat units represented by

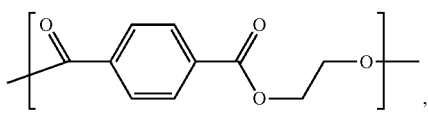

of the polyethylene terephthalate is broken. As the result, the number of repeat units represented by

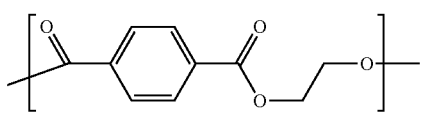

(i.e. i, j, or k) of the polyethylene terephthalate chain of the branched polymer is less than the number of repeat units represented by

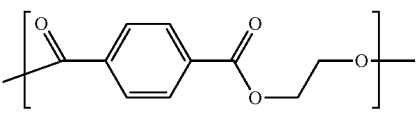

(i.e. n) of the starting material (polyethylene terephthalate) and a polyethylene terephthalate oligomer is obtained. Accordingly, the branched polymer of the disclosure has an irregular structure and high chain entanglement, thereby exhibiting an increased melt viscosity and melt strength. In addition, when the branched polymer of the disclosure is subjected to a foaming process, the obtained foam is resistant to deformation (i.e. the bubbles of the foam do not collapse before solidification).

According to some embodiments of the disclosure, the disclosure provides a method for preparing a foam. The method includes compounding the aforementioned branched polymer and a polyethylene terephthalate to obtain a mixture, and then subjecting the mixture to a foaming process. In particular, the weight ratio of the branched polymer to the polyethylene terephthalate is from 1:9 to 9:1. The foam can have an inherent viscosity from 0.95 dL/g to 1.50 dL/g, a shear viscosity from 600 Pa·s to 1400 Pa·s, a melt index from 2.5 g/10 min to 25 g/10 min, and a melt strength from 15 cN to 65 cN.

According to some embodiments of the disclosure, the polyethylene terephthalate as starting material for preparing the branched polymer of the disclosure can be the same as or different from the polyethylene terephthalate for compounding with the branched polymer. For example, the polyethylene terephthalate for compounding with the branched polymer can be commercial (or recycled) non-foamable polyethylene terephthalate. The molecular weight of the commercial polyethylene terephthalate can be less than the molecular weight of the branched polymer of the disclosure.

According to some embodiments of the disclosure, the foam of the disclosure can have a density from about 0.05 g/cm$^3$ to 0.65 g/cm$^3$, a bubble size from about 2 μm to 30 μm, a number average molecular weight from about 45,000 g/mol to 70,000 g/mol, and a polydispersity index from about 3.0 to 6.0.

According to some embodiments of the disclosure, the method for preparing a foam of the disclosure may further include the following steps. The mixture is then mixed with a chemical foaming agent, and the result is foamed by a single screw extruder at a temperature from about 200° C. to 270° C. Herein, the chemical foaming agent is unlimited and can be a chemical foaming agent using for foaming polyethylene terephthalate, such as dinitrosopentamethylenetetramine, azodicarbonamide, dinitrosopentamethylenetetramine, 4,4'-oxy-bis-(benzene-sulphonylhydrazide), trihydra-zinotriazine, N,N'-dimethyl-N,N'-dinitroso-terephthalamide, or a combination thereof.

According to some embodiments of the disclosure, the method for preparing a foam of the disclosure may further include the following steps. The mixture is molded to form a sheet, and then the sheet is immersed into a foaming agent at a temperature from 190° C. to 235° C. under a pressure from 1500 psi to 300 Opsi. Herein, the foaming agent can be a physical foaming agent or chemical foaming agent. For example, the physical foaming agent can be an inert gas, saturated aliphatic hydrocarbon, saturated alicyclic hydrocarbon, halogenated hydrocarbon, ether, or ketone, such as carbon dioxide, nitrogen, propane, butane, cyclohexane, methyl chloride, tetrafluoroethane, methyl sec-butyl ether, acetone, or a combination thereof.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation of Branched Polymer

Example 1

100 parts by weight of polyethylene terephthalate particles (having a number average molecular weight of about 45,000, an inherent viscosity of about 0.74, and a polydispersity index of about 1.80), 1.5 parts by weight of pentaerythritol (as polyol), and 0.3 parts by weight of 2,6-di-tert-butyl-4-methylphenol (as antioxidant) were mixed, obtaining a composition. Next, the composition was dried under 50 Pa at 110° C. for 12 hours. Next, the dried composition was inserted into a twin-screw extruder (with a screw diameter of 50 mm) to be mixed and pelletized, obtaining Pellet (1). In particular, the temperature of the twin-screw extruder was set at 240° C. and the screw speed of the extruder was set at 200 rpm. Next, the inherent viscosity (IV value) and the polydispersity index of Pellet (1) were measured and the results are shown in Table 1.

Next, Pellet (1) was dried under 50 Pa at 110° C. for 6 hours, and, then Pellet (1) was subjected to a solid-state polymerization under vacuum, obtaining Branched polymer (1). The solid-state polymerization was performed under a pressure of 10 Pa at a temperature of 240° C. for 12 hours. The solid-state polymerization was performed under a pressure of 10 Pa at a temperature of 240° C. for 12 hours. Next, the inherent viscosity (IV value), number average molecular weight, polydispersity index, melt index, shear viscosity, and melt strength of Branched polymer (1) were measured, and the results are shown in Table 1. The method for measuring the inherent viscosity (IV value), number average molecular weight, polydispersity index, melt index, shear viscosity, and melt strength are disclosed below.

Inherent viscosity (IV value): the polyester chip was dissolved in phenol/trichloroethylene (TCE) at 30° C. The solution was stirred using a stirring motor, and then the inherent viscosity of the solution was measured by viscometer.

Number average molecular weight (Mn) and polydispersity index (PDI): The number average molecular weight (Mn) and polydispersity index of the sample were measured by gel permeation chromatography (GPC);

Melt index: The melt index of the sample was measured at 190° C. under 2.16 kg load in accordance with ASTM D 1238;

Shear viscosity: The shear viscosity of the sample was measured at 290° C. in accordance with ASTM D4287 (at a shear rate of 50 rad/s);

Melt strength: The melt strength was determined using a capillary rheometer at 300° C. with a drawing device that pulls the molten polymer from the capillary die at a constant flow rate of 24 mm/s$^2$.

Comparative Example 1

100 parts by weight of polyethylene terephthalate particles (having a number average molecular weight of about 45,000, an inherent viscosity (IV value) of about 0.74, and a polydispersity index of about 1.80) was dried under 50 Pa at 110° C. for 8 hours. Next, the polyethylene terephthalate particles were subjected to a solid-state polymerization under vacuum, obtaining Polymer (1). The solid-state polymerization was performed under a pressure of 10 Pa at 240° C. for 12 hours. Next, the inherent viscosity (IV value), number average molecular weight, polydispersity index, melt index, shear viscosity, and melt strength of Polymer (1) were measured and the results are shown in Table 1.

Example 2

100 parts by weight of polyethylene terephthalate particles (having a number average molecular weight of about 39,500, an inherent viscosity (IV value) of about 0.63, and a polydispersity index of about 1.74), 1.5 parts by weight of pentaerythritol (as polyol), and 0.3 parts by weight of 2,6-di-tert-butyl-4-methylphenol (as antioxidant) were mixed, obtaining a composition. Next, the composition was dried under 50 Pa at 110° C. for 8 hours. Next, the dried composition was inserted into a twin-screw extruder (with a screw diameter of 50 mm) to be mixed and pelletized, obtaining Pellet (2). In particular, the temperature of the twin-screw extruder was set at 240° C. and the screw speed of the extruder was set at 200 rpm. Next, the inherent viscosity (IV value) and the polydispersity index of Pellet (2) were measured and the results are shown in Table 1.

Next, Pellet (2) was dried under 50 Pa at 110° C. for 6 hours, and, then Pellet (2) was subjected to a solid-state polymerization, obtaining Branched polymer (2). The solid-state polymerization was performed under a pressure of 10 Pa at 240° C. for 12 hours. Next, the inherent viscosity (IV value), number average molecular weight, polydispersity index, melt index, shear viscosity, and melt strength of Branched polymer (2) were measured, and the results are shown in Table 1.

Example 3

100 parts by weight of polyethylene terephthalate particles (number average molecular weight of about 35,000, an inherent viscosity (IV value) of about 0.55, and a polydispersity index of about 1.52), 1.5 parts by weight of pentaerythritol (as polyol), and 0.3 parts by weight of 2,6-di-tert-butyl-4-methylphenol (as antioxidant) were mixed, obtaining a composition. Next, the composition was dried under 50 Pa at 110° C. for 8 hours. Next, the dried composition was inserted into a twin-screw extruder (with a screw diameter of 50 mm) to be mixed and pelletized, obtaining Pellet (3). In particular, the temperature of the twin-screw extruder was set at 240° C. and the screw speed of the extruder was set at 200 rpm. Next, the inherent viscosity (IV value) and the polydispersity index of Pellet (3) were measured and the results are shown in Table 1.

Next, Pellet (3) was dried under 10 Pa at 110° C. for 6 hours, and, then Pellet (3) was subjected to a solid-state polymerization, obtaining Branched polymer (3). The solid-state polymerization was performed under a pressure of 10 Pa at 240° C. for 12 hours. Next, the inherent viscosity (IV value), number average molecular weight, polydispersity index, melt index, shear viscosity, and melt strength of Branched polymer (1) were measured, and the results are shown in Table 1.

Comparative Example 2

100 parts by weight of polyethylene terephthalate particles (having a number average molecular weight of about 35,000, an inherent viscosity (IV value) of about 0.55, and a polydispersity index of about 1.52) was dried under 50 Pa at 110° C. for 8 hours. Next, the polyethylene terephthalate particles were subjected to a solid-state polymerization under vacuum, obtaining Polymer (2). The solid-state polymerization was performed under a pressure of 10 Pa at 240° C. for 12 hours. Next, the inherent viscosity (IV value), number average molecular weight, polydispersity index, melt index, shear viscosity, and melt strength of Polymer (2) were measured and the results are shown in Table 1.

TABLE 1

|  |  | Example 1 | Comparative Example 1 | Example 2 | Example 3 | Comparative Example 2 |
|---|---|---|---|---|---|---|
| polyethylene terephthalate (parts by weight) | | 100 | 100 | 100 | 100 | 100 |
| polyol (parts by weight) | | 1.5 | — | 1.5 | 1.5 | — |
| antioxidant (parts by weight) | | 0.3 | — | 0.3 | 0.3 | — |
| polyethylene terephthalate | inherent viscosity (dL/g) | 0.74 | 0.74 | 0.63 | 0.55 | 0.55 |
| | number average molecular weight | 45,000 | 45,000 | 39,500 | 35,000 | 35,000 |
| | polydispersity index | 1.80 | 1.80 | 1.74 | 1.52 | 1.52 |
| pellet | inherent viscosity (dL/g) | 0.52 | — | 0.49 | 0.37 | — |
| | polydispersity index | 3.01 | — | 2.75 | 2.52 | — |
| polymer obtained via solid-state polymerization | IV value (dL/g) | 1.52 | 0.88 | 1.49 | 1.28 | 0.71 |
| | number average molecular weight | 85,000 | 48,000 | 79,000 | 75,500 | 42,000 |
| | polydispersity index | 5.57 | 1.92 | 5.49 | 4.98 | 1.75 |
| | melt index (g/10 min) | 1.1-3.5 | 32.9-35.8 | 0.8-1.5 | 4.9-6.8 | 58.2-69.8 |
| | shear viscosity (Pa · s) | 1577 | 489 | 1482 | 1258 | 390 |
| | melt strength (cN) | 72.5 | 9.2 | 66.1 | 59.7 | 7.7 |

As shown in Table 1, the branched polymer (such as Branched polymer (1) of Example 1 and Branched polymer (2) of Example 2), which was prepared by subjecting a pellet (prepared by reacting polyethylene terephthalate with polyol to undergo transesterification via a twin-screw extruder) to a solid-state polymerization, exhibits a relatively low melt index and a relatively high shear viscosity and melt strength.

Comparative Example 3

Comparative Example 3 was performed in the same manner as Example 1 except that the amount of polyol was reduced from 1.5 parts by weight to 0.3 parts by weight, obtaining Pellet (4). The inherent viscosity (IV value) and the polydispersity index of Pellet (4) were measured and the results are shown in Table 2.

Next, Pellet (4) was subjected to a solid-state polymerization in the same manner as Example 1, obtaining Branched polymer (4). The inherent viscosity (IV value), number average molecular weight, polydispersity index, melt index, shear viscosity, and melt strength of Branched polymer (4) were measured and the results are shown in Table 2.

Comparative Example 4

Comparative Example 4 was performed in the same manner as Example 1 except that the amount of polyol was increased from 1.5 parts by weight to 3.0 parts by weight, obtaining Pellet (5). The inherent viscosity (IV value) and the polydispersity index of Pellet (5) were measured and the results are shown in Table 2. Since the inherent viscosity of Pellet (5) is too low (less than 0.3 dL/g), Pellet (5) exhibits low melt strength and could not maintain a stable shape during strand pelletizing, and as a result the subsequent solid-state polymerization and measurement cannot be performed.

Comparative Example 5

100 parts by weight of polyethylene terephthalate particles (having a number average molecular weight of about 27,500, an inherent viscosity (IV value) of about 0.48, and a polydispersity index of about 1.58), 1.5 parts by weight of pentaerythritol (as polyol), and 0.3 parts by weight of 2,6-di-tert-butyl-4-methylphenol (as antioxidant) were mixed, obtaining a composition. Next, the composition was dried under 50 Pa at 110° C. for 8 hours. Next, the dried composition was inserted into a twin-screw extruder (with a screw diameter of 50 mm) to be mixed and pelletized, obtaining Pellet (6). In particular, the temperature of the twin-screw extruder was set at 240° C. and the screw speed of the extruder was set at 200 rpm. Next, the inherent viscosity (IV value) and the polydispersity index of Pellet (6) were measured and the results are shown in Table 2. Since the inherent viscosity of Pellet (6) is too low (less than 0.3 dL/g), Pellet (6) exhibits low melt strength and could not maintain a stable shape during strand pelletizing, and as a result the subsequent solid-state polymerization and measurement cannot be performed.

TABLE 2

|  |  | Example 1 | Comparative Example 3 | Comparative Example 4 | Comparative Example 5 |
|---|---|---|---|---|---|
| polyethylene terephthalate (parts by weight) | | 100 | 100 | 100 | 100 |
| polyol (parts by weight) | | 1.5 | 0.3 | 3.0 | 1.5 |
| antioxidant (parts by weight) | | 0.3 | 0.3 | 0.3 | 0.3 |
| polyethylene terephthalate | inherent viscosity (dL/g) | 0.74 | 0.74 | 0.74 | 0.48 |
| | number average molecular weight | 45,000 | 45,000 | 45,000 | 27,500 |
| | polydispersity index | 1.80 | 1.80 | 1.80 | 1.58 |
| pellet | inherent viscosity (dL/g) | 0.52 | 0.68 | 0.29 | 0.24 |

TABLE 2-continued

|  |  | Example 1 | Comparative Example 3 | Comparative Example 4 | Comparative Example 5 |
|---|---|---|---|---|---|
| polymer obtained via solid-state polymerization | polydispersity index | 3.01 | 2.01 | 3.44 | 2.45 |
|  | IV value (dL/g) | 1.52 | 0.91 | — | — |
|  | number average molecular weight | 85,000 | 51,000 | — | — |
|  | polydispersity index | 5.57 | 2.34 | — | — |
|  | melt index (g/10 min) | 1.1-3.5 | 21.1-28.2 | — | — |
|  | shear viscosity (Pa · s) | 1577 | 664 | — | — |
|  | melt strength (cN) | 72.5 | 11.3 | — | — |

As shown in Table 2, when the amount of polyol in the composition is too low, the obtained branched polymer (such as Branched polymer (4) of Comparative Example 3) exhibits a relatively high melt index, a relatively low shear viscosity and a relatively low melt strength. In addition, when the amount of polyol in the composition is too high, the obtained pellet (such as Pellet (5) of Comparative Example 4) exhibits a relatively low inherent viscosity (IV value) and could not maintain a stable shape during strand pelletizing, and as a result the subsequent solid-state polymerization cannot be performed. Moreover, when the polyethylene terephthalate has a relatively low number average molecular weight (Mn), the obtained pellet (such as Pellet (6) of Comparative Example 5) exhibits a relatively low inherent viscosity (IV value) and could not maintain a stable shape during strand pelletizing, and as a result the subsequent solid-state polymerization cannot be performed.

Preparation of Foam

Comparative Example 6

100 parts by weight of polyethylene terephthalate particles (having a number average molecular weight of about 45,000, an inherent viscosity (IV value) of about 0.74, and a polydispersity index of about 1.80) was molded at 245° C. via an injection molding machine to form a sheet (with a thickness of 0.2 mm). Next, the sheet was inserted into a supercritical fluid foaming apparatus. The pressure of the supercritical fluid storage tank was set at 2500 psi such that the carbon dioxide in the supercritical fluid storage tank behaved as a supercritical fluid. Next, the supercritical carbon dioxide was injected into the supercritical fluid foaming apparatus, and the temperature of the supercritical fluid foaming apparatus was set at 210° C. and the pressure of the supercritical fluid foaming apparatus was set at 2500 psi. After 15 minutes, the supercritical fluid foaming apparatus was cooled to room temperature and the pressure of the supercritical fluid foaming apparatus was then reduced to the atmospheric pressure. The characteristics of the product were measured and the results are shown in Table 3. The density of foam was measured in accordance with ASTM D792; and the bubble size of foam was determined by measuring pores distribution in the cross-section of foam via a scanning electron microscopy and image processing software.

Example 4

90 parts by weight of polyethylene terephthalate particles (having a number average molecular weight of about 45,000, an inherent viscosity (IV value) of about 0.74, and a polydispersity index of about 1.80) and 10 parts by weight of Branched polymer (1) (prepared from Example 1) were blended at 250° C. via a twin-screw extruder, The result was molded at 245° C. via an injection molding machine to form a sheet (with a thickness of 0.2 mm). Next, the sheet was inserted into a supercritical fluid foaming apparatus. The pressure of the supercritical fluid storage tank was set at 2500 psi such that the carbon dioxide in the supercritical fluid storage tank behaved as a supercritical fluid. Next, the supercritical carbon dioxide was injected into the supercritical fluid foaming apparatus, and the temperature of the supercritical fluid foaming apparatus was set at 210° C. and the pressure of the supercritical fluid foaming apparatus was set at 2500 psi. After 15 minutes, the supercritical fluid foaming apparatus was cooled to room temperature and the pressure of the supercritical fluid foaming apparatus was then reduced to the atmospheric pressure, obtaining Foam (1). The characteristics of Foam (1) were measured and the results are shown in Table 3.

Example 5

Example 5 was performed in the same manner as Example 4 except that the amount of polyethylene terephthalate was reduced from 90 parts by weight to 70 parts by weight and the amount of Branched polymer (1) was increased from 10 parts by weight to 30 parts by weight, obtaining Foam (2). The characteristics of Foam (2) were measured and the results are shown in Table 3.

Example 6

Example 6 was performed in the same manner as Example 4 except that the amount of polyethylene terephthalate was reduced from 90 parts by weight to 50 parts by weight and the amount of Branched polymer (1) was increased from 10 parts by weight to 50 parts by weight, obtaining Foam (3). The characteristics of Foam (3) were measured and the results are shown in Table 3.

Example 7

Example 7 was performed in the same manner as Example 4 except that the amount of polyethylene terephthalate was reduced from 90 parts by weight to 30 parts by weight and the amount of Branched polymer (1) was increased from 10 parts by weight to 70 parts by weight, obtaining Foam (4). The characteristics of Foam (4) were measured and the results are shown in Table 3.

Example 8

Example 8 was performed in the same manner as Example 4 except that the amount of polyethylene terephthalate was reduced from 90 parts by weight to 10 parts by weight and the amount of Branched polymer (1) was increased from 10 parts by weight to 90 parts by weight, obtaining Foam (5). The characteristics of Foam (5) were measured and the results are shown in Table 3.

|  | Comparative Example 6 | Example 4 | Example 5 | Example 6 | Example 7 | Example 8 |
|---|---|---|---|---|---|---|
| polyethylene terephthalate (parts by weight) | 100 | 90 | 70 | 50 | 30 | 10 |
| branched polymer (parts by weight) | 0 | 10 | 30 | 50 | 70 | 90 |
| inherent viscosity (dL/g) | 0.74 | 0.95 | 1.19 | 1.32 | 1.45 | 1.46 |
| number average molecular weight | 45,000 | 51,200 | 55,000 | 60,000 | 68,000 | 68,500 |
| polydispersity index | 1.80 | 3.11 | 4.27 | 4.92 | 5.15 | 5.34 |
| melt index (g/10 min) | 68.5-63.5 | 20.6-24.8 | 11.2-16.3 | 9.8-12.5 | 4.8-9.5 | 2.9-4.2 |
| shear viscosity (Pa·s) | 464 | 692 | 852 | 1057 | 1315 | 1395 |
| melt strength (cN) | 7.2 | 15.2 | 26.3 | 39.8 | 43.0 | 63.2 |
| density | 1.18 | 0.59 | 0.44 | 0.23 | 0.12 | 0.06 |
| bubble size (μm) | unfoamed | 2.4-6.8 | 3.1-8.5 | 6.4-9.3 | 9.7-22.5 | 10.2-27.8 |

As shown in Table 3, the foam, prepared by compounding the non-foamable polyethylene terephthalate with the branched polymer of the disclosure, exhibits high melt viscosity and melt strength.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A branched polymer, which is a transesterification product of a composition, wherein the composition comprises 100 parts by weight of polyethylene terephthalate and 0.5-2 parts by weight of polyol, wherein the branched polymer has an inherent viscosity of from 1.2 dL/g to 1.6 dL/g, a number average molecular weight of from 75,000 g/mol to 90,000 g/mol, a polydispersity index from 3.0 to 6.0, a melt index from 0.8 g/10 min to 7.5 g/10 min, a shear viscosity from 800 Pa·s to 1900 Pa·s, and a melt strength from 30 cN to 80 cN.

2. The branched polymer as claimed in claim 1, wherein the polyethylene terephthalate has a number average molecular weight from 30,000 g/mol to 55,000 g/mol, a polydispersity index from 1.4 to 1.8, and an inherent viscosity from 0.40 dL/g to 0.95 dL/g.

3. The branched polymer as claimed in claim 1, wherein the polyol is polyether polyol having 3-8 hydroxyl groups, aliphatic polyol having 3-8 hydroxyl groups, or a combination thereof.

4. The branched polymer as claimed in claim 1, wherein the composition does not comprise an organic acid, acid anhydride, epoxy-group-containing compound, or solvent.

5. The branched polymer as claimed in claim 1, wherein the composition further comprises 0.1-0.5 parts by weight of antioxidant.

6. The branched polymer as claimed in claim 5, wherein antioxidant is selected from a group consisting of hindered phenol antioxidant, ester antioxidant, thioester antioxidant and phosphite antioxidant.

7. A method for preparing the branched polymer as claimed in claim 1, comprising:
subjecting a composition to a transesterification via an extruder to obtain a pellet, wherein the composition comprises 100 parts by weight of polyethylene terephthalate and 0.5-2 parts by weight of polyol, wherein the polyethylene terephthalate has a number average molecular weight (Mn) from 30,000 g/mol to 55,000 g/mol, and the polyethylene terephthalate has an inherent viscosity from 0.40 dL/g to 0.95 dL/g;
drying the pellet; and
subjecting the pellet to a solid-state polymerization.

8. The method as claimed in claim 7, wherein the extruder is a twin-screw extruder.

9. The method as claimed in claim 7, wherein the polyethylene terephthalate has a polydispersity index from 1.4 to 1.8.

10. The method as claimed in claim 7, wherein the transesterification has a process temperature from 220° C. to 270° C., and the extruder has a screw speed from 100 rpm to 500 rpm.

11. The method as claimed in claim 7, wherein the pellet is dried at a pressure from 20 Pa to 100 Pa and a temperature of 90° C. to 130° C. for more than 5 hours.

12. The method as claimed in claim 7, wherein the solid-state polymerization is performed under a pressure from 10 Pa to 50 P at a temperature from 180° C. to 240° C. for 6-24 hours.

13. A method for preparing a foam, comprising:
compounding the branched polymer as claimed in claim 1 and a polyethylene terephthalate to obtain a mixture, wherein the weight ratio between the branched polymer and the polyethylene terephthalate is from 1:9 to 9:1; and
subjecting the mixture to a foaming process,
wherein the foam has an inherent viscosity from 0.95 dL/g to 1.50 dL/g, a shear viscosity from 600 Pa·s to 1400 Pa·s, a melt index from 2.5 g/10 min to 25 g/10 min, and a melt strength from 15 cN to 65 cN.

14. The method as claimed in claim 13, wherein the foaming process comprises:
mixing the mixture with a chemical foaming agent, and then foaming at a temperature from 200 to 270° C. via an extruder.

15. The method as claimed in claim 13, wherein the foaming process comprises:
molding the mixture to form a sheet; and
immersing the sheet into a foaming agent at a temperature from 190° C. to 235° C. under a pressure from 1500 psi to 3000 psi.

16. The method as claimed in claim 13, wherein the foam has a density from 0.05 g/cm$^3$ to 0.65 g/cm$^3$, a bubble size from 2 μm to 30 μm, a number average molecular weight from 45,000 g/mol to 70,000 g/mol, and a polydispersity index from 3.0 to 6.0.

\* \* \* \* \*